(12) United States Patent
Huang et al.

(10) Patent No.: US 12,499,651 B2
(45) Date of Patent: Dec. 16, 2025

(54) IMAGE PROCESSOR AND OPERATION METHOD FOR OPTIMIZING ON SCREEN DISPLAY RESOLUTION

(71) Applicant: NOVATEK Microelectronics Corp., Hsinchu (TW)

(72) Inventors: Chih-Hsuan Huang, Tainan (TW); Hung-Ming Wang, Tainan (TW)

(73) Assignee: NOVATEK Microelectronics Corp., Hsinchu (TW)

( * ) Notice: Subject to any disclaimer, the term of this patent is extended or adjusted under 35 U.S.C. 154(b) by 362 days.

(21) Appl. No.: 18/327,894

(22) Filed: Jun. 2, 2023

(65) Prior Publication Data

US 2024/0404242 A1   Dec. 5, 2024

(51) Int. Cl.
| | |
|---|---|
| *G06V 10/75* | (2022.01) |
| *G06T 5/70* | (2024.01) |
| *G06V 10/25* | (2022.01) |
| *G06V 10/56* | (2022.01) |

(52) U.S. Cl.
CPC .............. *G06V 10/751* (2022.01); *G06T 5/70* (2024.01); *G06V 10/25* (2022.01); *G06V 10/56* (2022.01)

(58) Field of Classification Search
CPC ...... G06V 10/751; G06V 10/25; G06V 10/56; G06T 5/70; H04N 9/646; H04N 5/265; H04N 9/73; H04N 9/77
See application file for complete search history.

(56) References Cited

U.S. PATENT DOCUMENTS

| | | |
|---|---|---|
| 8,538,197 B2 | 9/2013 | Kobayashi et al. |
| 2012/0188459 A1* | 7/2012 | Madonna ............ H04L 12/282 |
| | | 348/E9.055 |

FOREIGN PATENT DOCUMENTS

| | | | |
|---|---|---|---|
| CN | 110187943 A | 8/2019 | |
| TW | 201011684 A | 3/2010 | |
| TW | I618029 B | * 3/2018 | ............... G06T 5/50 |

OTHER PUBLICATIONS

"Chimienti et. al., A Novel Co-Decoding Scheme to Reduce Memory in MPEG-2 MP@ML Decoder, Oct. 1998, 1998 URSI International Symposium on Signals, Systems, and Electronics. Conference Proceedings, Cat. No.98EX167" (Year: 1998).*

"Raman Maini et. al., Study and Comparison of Various Image Edge Detection Techniques, 2009, International Journal of Image Processing, vol. 3, Issue 1" (Year: 2009).*

* cited by examiner

*Primary Examiner* — Chineyere Wills-Burns
*Assistant Examiner* — Phuong Hau Cai
(74) *Attorney, Agent, or Firm* — CKC & Partners Co., LLC (57) ABSTRACT

An operation method performed by an image processor is provided, including the following operations of receiving a mixed image including an input image and a first on-screen-display (OSD) pattern and generating a second OSD pattern, different from the first OSD pattern, based on the mixed image. The second OSD pattern encompasses protection regions of the input image, and the protection regions are in close proximity of the first OSD pattern. The method further includes operations of performing image processing to remaining regions, different from the protection regions, of the input image and generating an output image. The output image includes the second OSD pattern and the remaining regions of the input image, being performed by the image processing.

10 Claims, 8 Drawing Sheets

IMAGE PROCESSOR AND OPERATION METHOD FOR OPTIMIZING ON SCREEN DISPLAY RESOLUTION

BACKGROUND

Field of Invention

The disclosure relates to an image processor and an operation method thereof. More particularly, the disclosure relates to an image processor and an operation method involving optimized on screen display resolution for image processing.

Description of Related Art

The existing OSD bits are not very accurate since they were designed to work in blocks, which can lead to issues in image processing. The low precision of OSD bits results in unnecessary protection at the edges of the user interface, leading to unnatural and discontinuous areas once the background passes through the image processing. Additionally, due to block sampling, some small user interface elements may be missed. Methods like igamma, CCE, SR, 3D LUT, etc., require pixel-wise accuracy, and missing or redundant OSDs can cause significant errors.

SUMMARY

The disclosure provides an operation method performed by an image processor, including the following operations: receiving a mixed image including an input image and a first on-screen-display (OSD) pattern; generating a second OSD pattern, different from the first OSD pattern, based on the mixed image. The second OSD pattern encompasses protection regions of the input image, and the protection regions are in close proximity of the first OSD pattern. The method further includes operations of performing image processing to remaining regions, different from the protection regions, of the input image and generating an output image. The output image includes the second OSD pattern and the remaining regions of the input image, being performed by the image processing.

It is to be understood that both the foregoing general description and the following detailed description are demonstrated by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1:
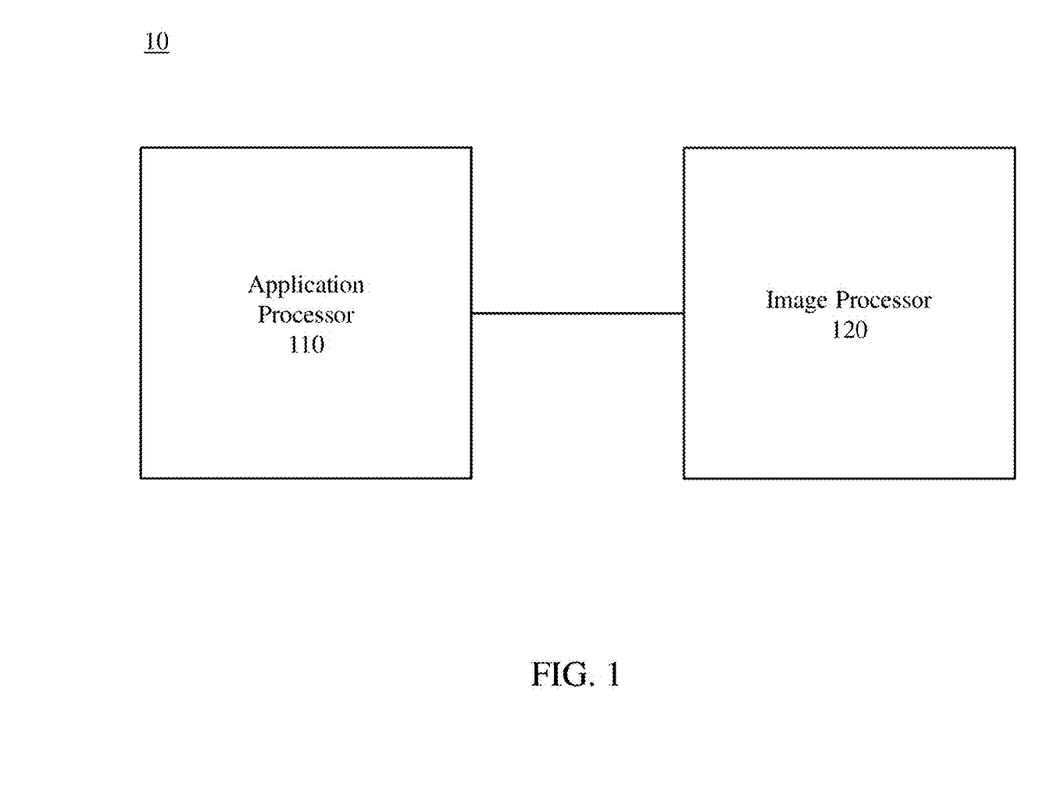
FIG. 1 is a schematic diagram of an electrical device deploying an on screen display (OSD) technology, in accordance with some embodiments of the disclosure.

Reference is now made to FIG. 1. The electrical device of FIG. 1 includes an application processor (AP) 110 and an image processor 120. In some embodiments, the application processor 110 is configured to generate mixed images by blending on a screen display (OSD) pattern, a designed intermediate layer, and images of an input video and further to provide the mixed images to the image processor 120. The image processor 120 is configured to generate output images to include a pixel-wise OSD pattern based on analyzed OSD map associated with the OSD pattern and blending images that are decoded according to the mixed images. Due to its pixel-wise accuracy, the OSD pattern can be applied in a broad range of image processing effect protection scenarios, providing significant benefits over alternative methods that lack the same level of precision.

Figure 2:
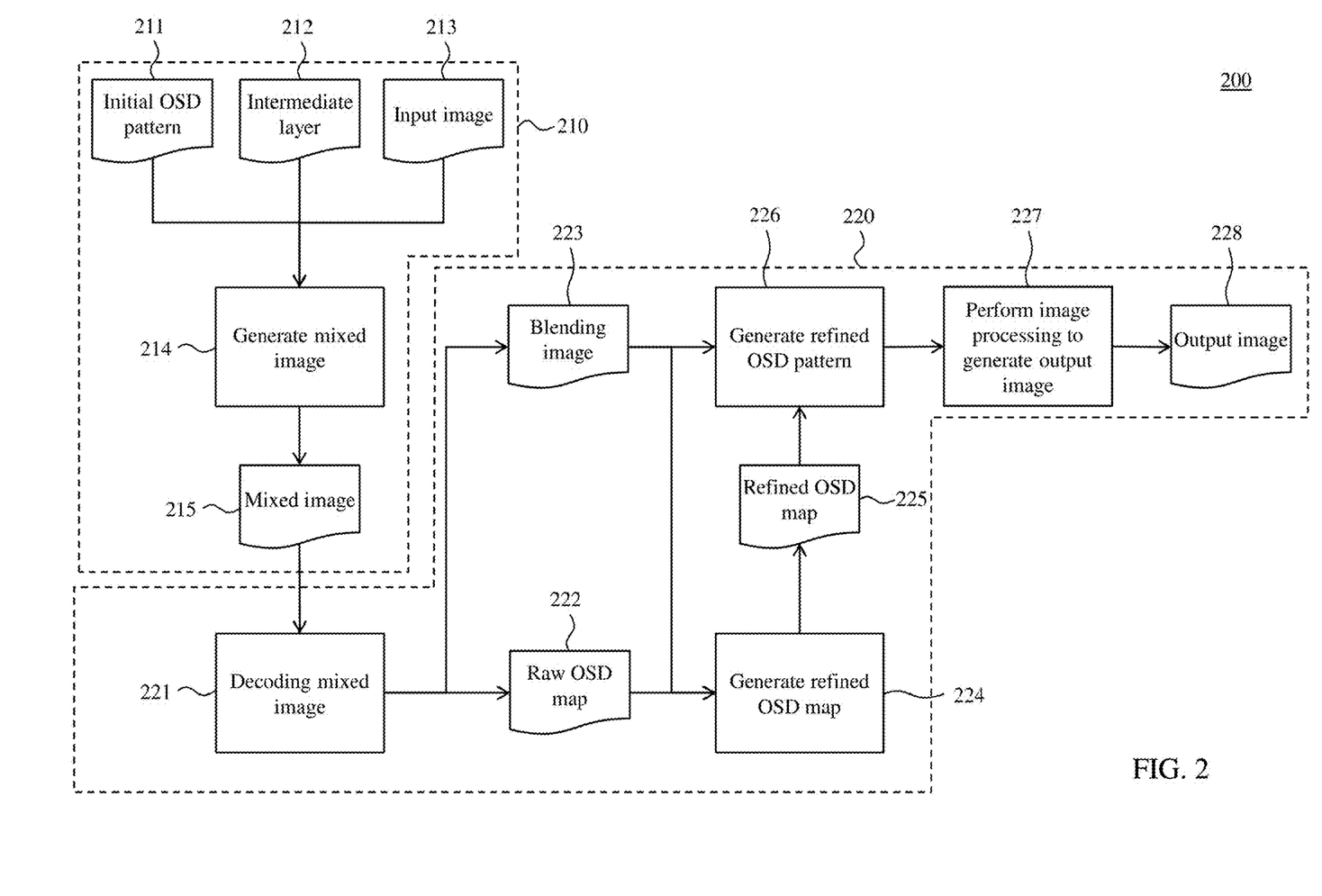
FIG. 2 is a schematic diagram of a flowchart of an operation method of the electrical device corresponding to FIG. 1, in accordance with some embodiments of the disclosure.

Reference is now made to FIG. 2. FIG. 2 is a schematic diagram of a flowchart of an operation method 20 of the electronic device 10 corresponding to FIG. 1, in accordance with some embodiments of the disclosure. It is understood that additional operations can be provided before, during, and after the processes shown by FIG. 2, and some of the operations described below can be replaced or eliminated, for additional embodiments of the method. The order of the operations/processes may be interchangeable. Throughout the various views and illustrative embodiments, like reference numbers are used to designate like elements. The operation method 20 includes portions 210 and 220 that are described below with reference to the electronic device 10 of FIG. 1 and FIGS. 3-10.

According to some embodiments, in the portion 210, the application processor 110 of the electronic device 10 generates a mixed image 215 by blending an initial OSD pattern 211 and an input image 213 with an intermediate layer 212 during the operation 214. Alternatively stated, the mixed image 215 includes the initial OSD pattern 211 and the input image 213.

Figure 3:
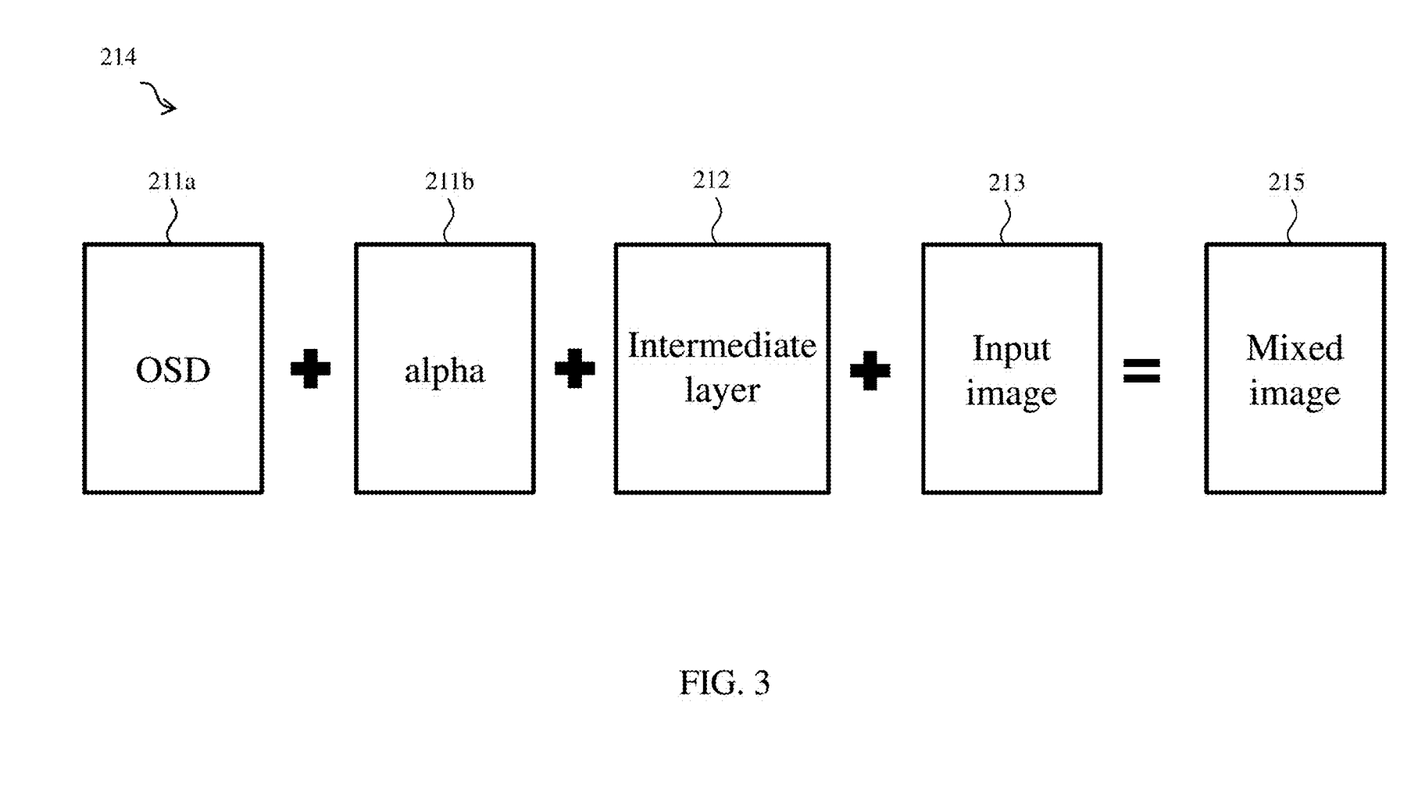
FIG. 3 is a schematic diagram of the operation in the method corresponding to FIG. 2, in accordance with some embodiments of the disclosure.

For example, as shown in FIG. 3 illustrating a schematic diagram of the operation 214 in the operation method 20 corresponding to FIG. 2, in accordance with some embodiments of the disclosure, the initial OSD pattern 211 blended by OSD pattern data 211a and alpha channel data 211b is further combined with image data of the intermediate layer 212 and image data of the input image 213 to obtain the mixed image 215. In some embodiments, the initial OSD pattern 211 includes user interface (UI) information overlaying on the input image 213 and is also referred to as a UI layer.

In some embodiments, each of the OSD pattern data 211a and the input image 213 includes data of color channels (such as red(R), green(G), and blue(B)). The alpha channel data 211b is used to define the transparency by grayscale values. The intermediate layer 212 also includes an alpha channel data and data of color channels. Accordingly, in some embodiments of the mixed image 215 having RGB channels, a pixel value of one color channel for each pixel in the mixed image 215 is represented by the equation (1) as below:

$$L_{MIXED} = (L_{input}(1-\alpha_i) + L_i\alpha_i)(1-\alpha_{UI}) + L_{UI}\alpha_{UI} \quad (1)$$
$$= L_{input}(1-\alpha_{UI}) + L_{UI}\alpha_{UI} - L_{input}\alpha_i(1-\alpha_{UI}) + L_i\alpha_i(1-\alpha_{UI})$$

in which $L_{input}$ corresponds to a value of one color channel for a corresponding pixel in the input image 213, $L_i$ corresponds to a value of one color channel for a corresponding pixel in the intermediate layer 212, at corresponds to an alpha value of the alpha channel for a corresponding pixel in the intermediate layer 212, $L_{UI}$ corresponds to a value of one color channel for a corresponding pixel in the initial OSD pattern 211, and $\alpha_{UI}$ corresponds to an alpha value of the alpha channel for a corresponding pixel in the initial OSD pattern 211.

The configurations of color channels are given for illustrative purposes. Various implements are within the contemplated scope of the present disclosure. For example, in some embodiments, color models may include CMYK (stands for Cyan, Magenta, Yellow, and Black) model, HSV (stands for Hue, Saturation, and Value) model, YUV (stands for Luminance (Y), and the two chrominance components (U and V)), or other suitable color models.

Figure 4:
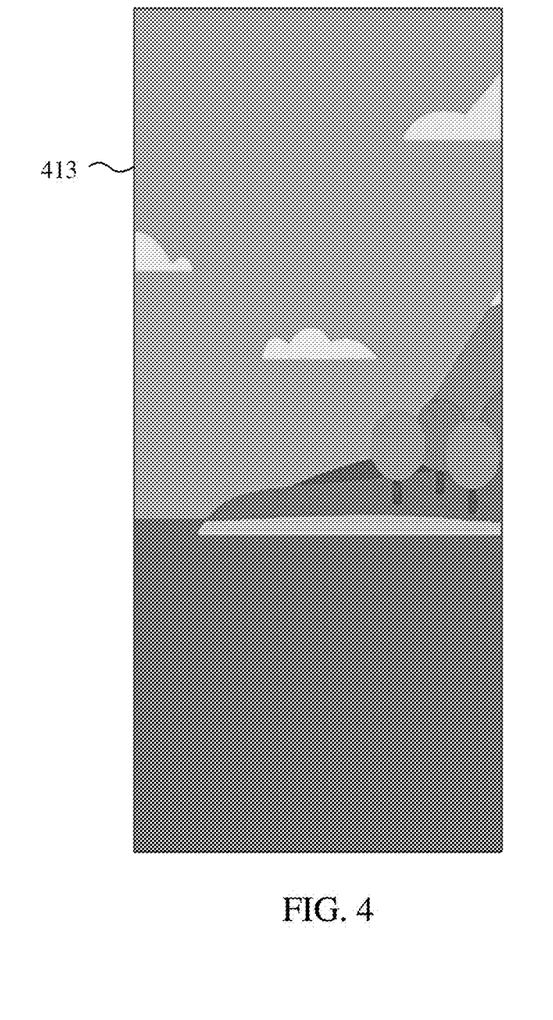
FIG. 4 is a schematic diagram of an input image, in accordance with some embodiments of the disclosure.
Figure 5:
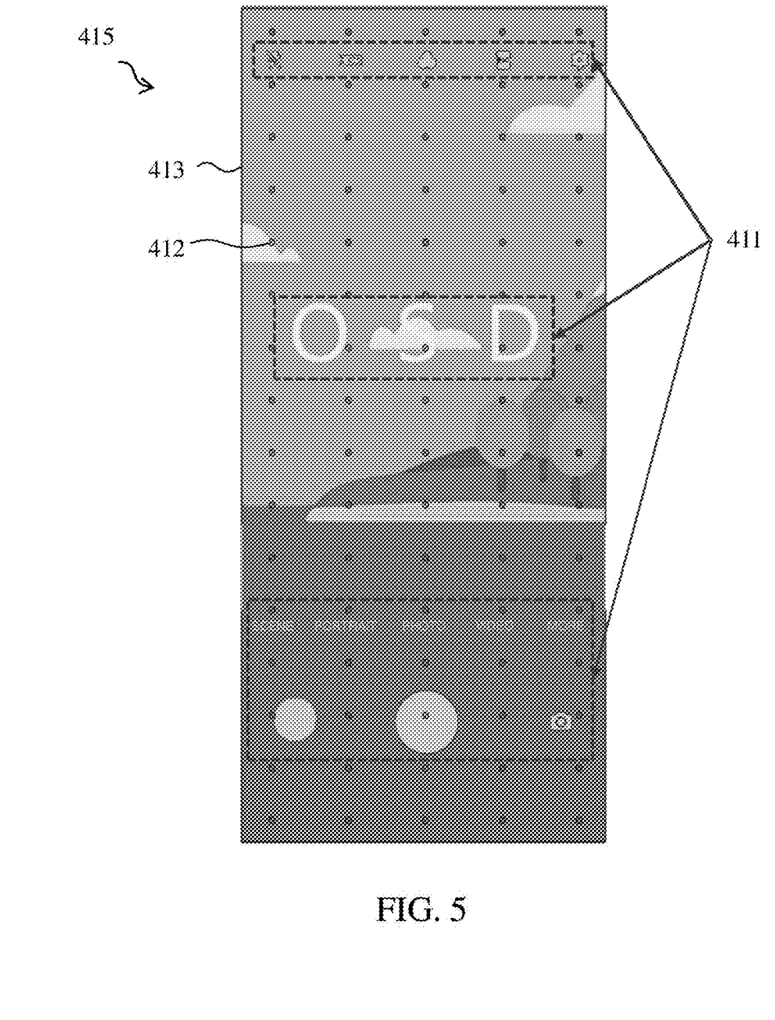
FIG. 5 is a schematic diagram of a mixed image, in accordance with some embodiments of the disclosure.

Reference is now made to FIGS. 4-5. FIG. 4 is a schematic diagram of an input image 413, and FIG. 5 is a schematic diagram of a mixed image 415, in accordance with some embodiments of the disclosure. In some embodiments, the input image 413 is configured with respect to, for example, the input image 213, and the mixed image 415 is configured with respect to, for example, the mixed image 215.

For illustration, the mixed image 415 includes OSD pattern 411, the input image 413, and an intermediate layer 412 including reference points schematically symbolized by dots.

After the mixed image is generated, with reference back to FIG. 2 again, in portion 220, the image processor 120 receives the mixed image 215 (e.g., the mixed image 415 in FIG. 5) and generates a raw OSD map 222 and a blending image 223.

Figure 8:
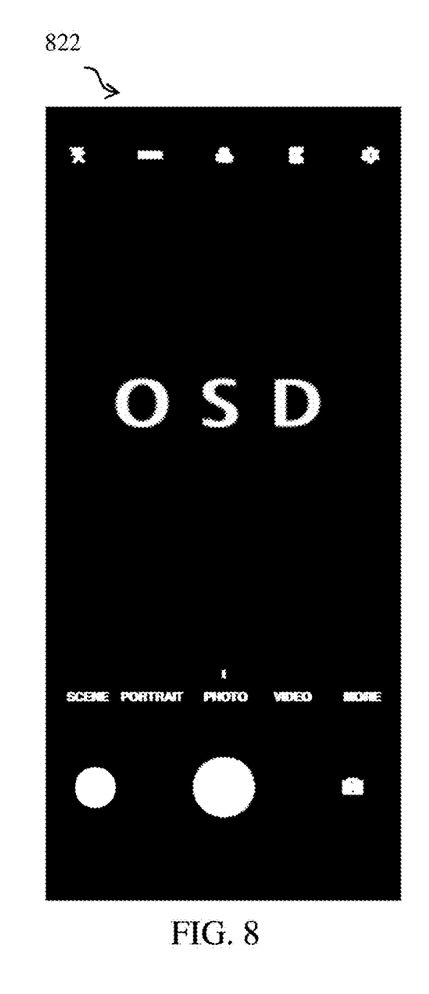
FIG. 8 is a schematic diagram of a raw OSD map, in accordance with some embodiments of the disclosure.

Specifically, in the operation 221, the image processor 120 decodes the mixed image 215 to extract OSD information and color image information. For example, the image processor 120 adjusts the alpha values at to have a value (e.g., "1") in the equation (1) and the pixel value for each pixel is represented as below:

$$L_{ROSD}=L_{UI}\alpha_{UI}$$

in which $L_{ROSD}$ corresponds to a value for a corresponding pixel in the raw OSD map 222 (e.g., schematically shown a raw OSD map 822 of FIG. 8 generated based on the mixed image 415).

Figure 6:
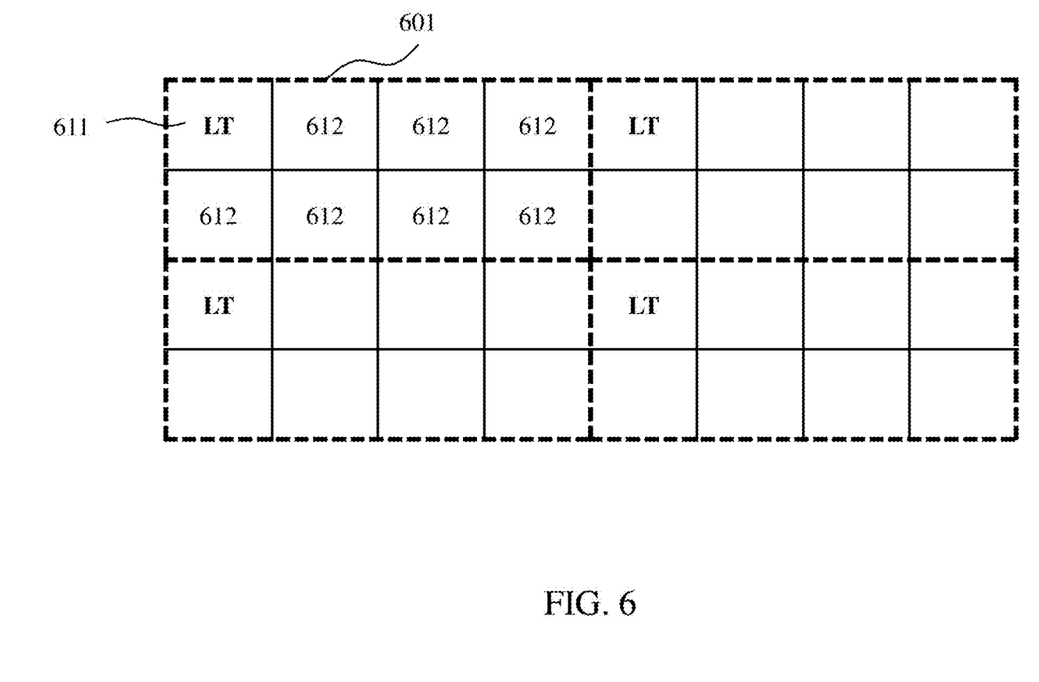
FIG. 6 illustrates part of a raw OSD map, in accordance with some embodiments of the disclosure.

In some embodiments, as shown in FIG. 6 illustrating part of the raw OSD map 222, the raw OSD map 222 includes multiple blocks 601 that each block 601 consists of 8 pixels, with a length of 4 pixels and a width of 2 pixels. According to some embodiments, the pixel value (e.g., $L_{ROSD}$) of the reference (situated on top left(LT) of one block 601) pixel 611 in one block 601 includes the OSD information and represents the OSD information of other pixels 612 in the same block 601. In other words, the remaining pixels 612 in block 601 possess an identical pixel value to that of the reference pixel 611. It is also noteworthy that all pixels within the block share the same alpha value. To illustrate, when a pixel, having the same pixel coordination as the reference pixel 611, in the mixed image 415 is within the OSD pattern (e.g., the OSD pattern 411), the 1-bit pixel value of the reference pixel 611 may be "1." Consequently, the entire block 601 is rendered as "bright," as depicted in the various embodiments of the raw OSD map 822 presented in FIG. 8. On the contrary, when the pixel in the mixed image 415 is outside of the OSD pattern, the 1-bit pixel value of the reference pixel 611 may be "0." Consequently, the entire block 601 is rendered as "dark," as shown in FIG. 8.

Figure 9:
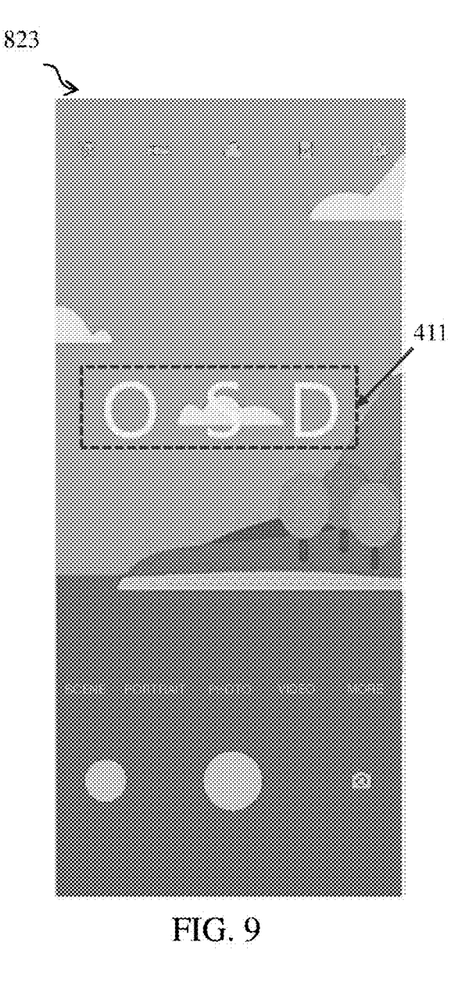
FIG. 9 is a schematic diagram of a blending image, in accordance with some embodiments of the disclosure.

Moreover, the image processor 120 adjusts the alpha values $\alpha_i$ to have a zero value in the equation (1) and the pixel value for each pixel is represented as below:

$$L_{BLEND}=L_{input}(1-\alpha_{UI})+L_{UI}\alpha_{UI}$$

in which $L_{BLEND}$ corresponds to a pixel value of one color channel in the blending image 223 (e.g., a blending image 823 of FIG. 9 generated based on the mixed image 415). In some embodiments, regions in the blending image 223 including no OSD information (i.e., $L_{UI}\alpha_{UI}$ equals to 0,) have same pixel values of corresponding regions in the input image 213. For example, with reference to FIGS. 4 and 9, the corresponding regions in the input image 413 and regions in the blending image 823 that do not contain OSD information have identical pixel values.

Referring to FIG. 2 again, in operation 224, the image processor 120 further generates a refined OSD map 225 based on the raw OSD map 222 and the blending image 223. In some embodiments, a pixel value of a pixel being verified in the blending image 223 is compared with pixel values of pixels in neighbor blocks (for example, six blocks) in raw OSD map 222 that are around it and correspond to the reference pixels in the raw OSD map 222 in order to generate a value for a pixel has the same pixel coordination in the refined OSD map 225. In some embodiments, the pixel having non-zero value in the refined OSD map 225 indicates that a pixel having the same pixel coordination in the blending image 223 belongs to a refined OSD pattern (e.g., schematically shown a refined OSD map 825 of FIG. 10 generated based on the mixed image 415).

Figure 7:
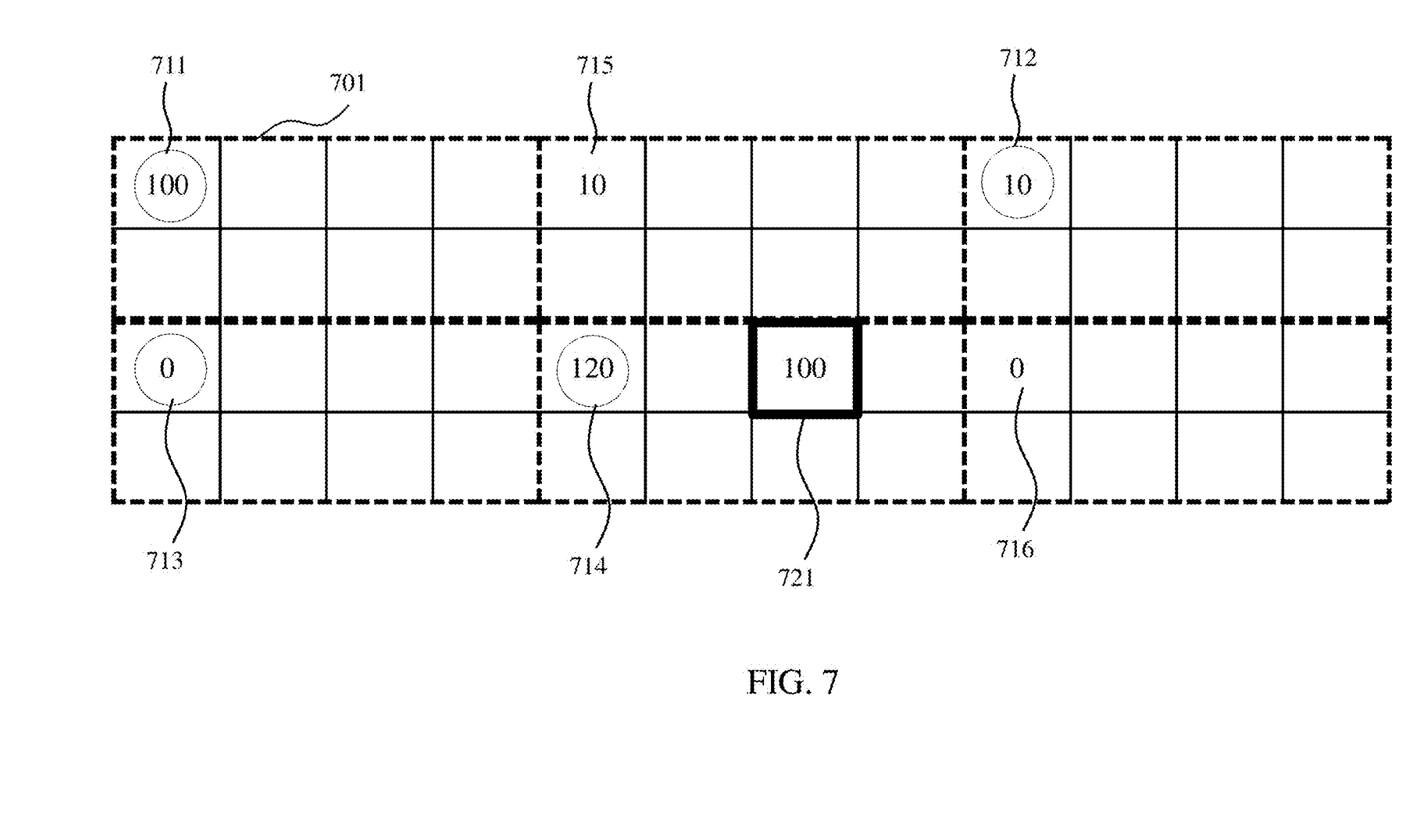
FIG. 7 illustrates part of a blending image, in accordance with some embodiments of the disclosure.

Specifically, for example, with reference to FIG. 7 illustrating part of the blending image 223, the pixels situated on the top left in each of blocks 701 are referred to as reference pixels and key pixels (circled ones) 711-714 are identified by the raw OSD map 222 as belonging to the OSD pattern (e.g., the OSD pattern 411). In some embodiments, the pixel values of the key pixels 711-714 in the raw OSD map 222 are "1," and the pixel values of non-key pixels (not-circled ones) 715-716 in the raw OSD map 222 are "0."

The image processor 120 identifies whether the pixel belongs to the OSD pattern based on two rules. In some embodiments, the pixels fulfilled the rules in the blending image 223 (and/or in the mixed image 215) have similar color. The first rule indicates that a difference between a maximum of pixel values of key pixels and a maximum of pixel values of non-key pixels is within an adaptive range, for example, smaller than a predetermined value (e.g., 220.) The second rule indicates that a difference between a maximum of pixel values of the key pixels 711-714 and the pixel value of a pixel being verified, for example, a pixel 721 is within an adaptive range, for example, smaller than a half of a maximum in pixel values of key pixels and a maximum in pixel values of non-key pixels.

For example, as shown in FIG. 7, regarding the first rule, the image processor 120 compares a maximum of the pixel values of the key pixels 711-714 and a maximum of the pixel values of the non-key pixels 715-716 to obtain a difference. The difference between the maximum of the pixel values of the key pixels 711-714 and the maximum of the pixel values of the non-key pixels 715-716 equals to 110 (i.e., the pixel value of "120" of the key pixel 714 minus the pixel value of "10" of the non-key pixel 715,) which is smaller than the predetermined value of "220." Accordingly, the first rule is fulfilled.

Regarding the second rule, the maximum of the pixel values of the key pixels 711-714 is 120, and the maximum of the pixel values of the non-key pixels 715-716 is 10. The difference between the maximum (i.e., "120") of the pixel values of the key pixels 711-714 and the pixel value (i.e., "100") of the pixel 721 equals to 20, which is smaller than the half (i.e., "55") of the difference between the maximum of the pixel values of the key pixels 711-714 and the maximum of the pixel values of the non-key pixels 715-716. Accordingly, the second rule is fulfilled.

Based on the discussion above, as the pixel value of the pixel 721 matches the first and second rules, the pixel 721 is verified as included in the OSD pattern. Consequently, the pixel corresponding to the pixel 721 in the refined OSD map 225 has non-zero value and is rendered as "bright," as depicted in the various embodiments of the refined OSD map 225 presented in FIG. 9. Alternatively stated, the refined OSD map 225 indicates positions of pixels in the blending image 223 wherein differences between the pixel values of the pixels in the blending image 223 and the maximum of the pixel values of the key pixels 711-714 are within an adaptive range.

Figure 10:
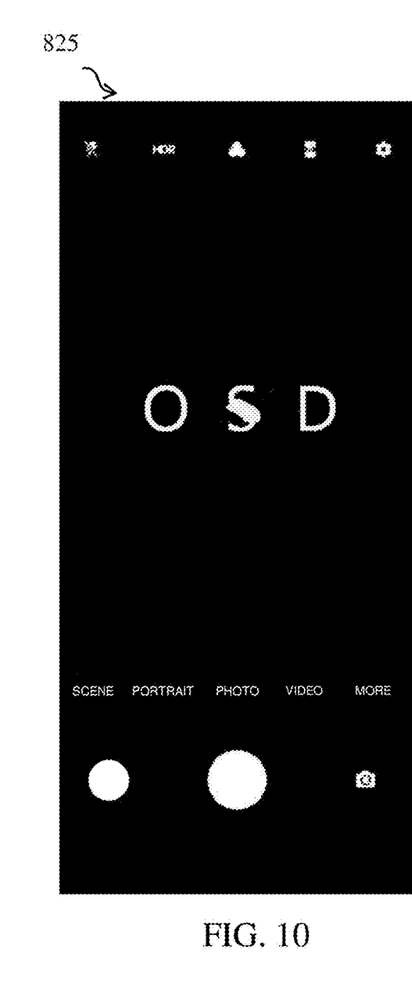
FIG. 10 is a schematic diagram of a refined OSD map, in accordance with some embodiments of the disclosure.

Moreover, in some embodiments, as shown in FIGS. 9 and 10, with the configurations of the present disclosure, the pixels (e.g., around the alphabet "S") that are in close proximity of the OSD pattern 411 and have color similar to the OSD pattern 411 are identified as belonging to OSD pattern and referred to as protection regions. On the contrary, for pixels do not match the first and second rules are referred to as remaining regions. For example, when the difference between the maximum and the pixel value of the pixel 721 is out of the adaptive range, for example, greater than the half of a maximum difference and a minimum difference between the pixel values of the key pixels 711-714 and the non-key pixels 715-716. The pixel 721 belongs to the remaining regions.

The configurations of the adaptive range are given for illustrative purposes. Various implements are within the contemplated scope of the present disclosure.

After the refined OSD map 225 is obtained, the image processor 120 performs the operation 226 to generate a refined OSD pattern including protection regions based on the blending image 223 and the refined OSD map 225 and further executes the operation 227 to perform image processing to remaining regions of the blending image 223 for generating an output image 228. In some embodiments, performing image processing includes performing color changing processing to the remaining regions. In various embodiments, the image processing includes image stylization, color correction, image filtering, or other suitable processing.

Figure 11:
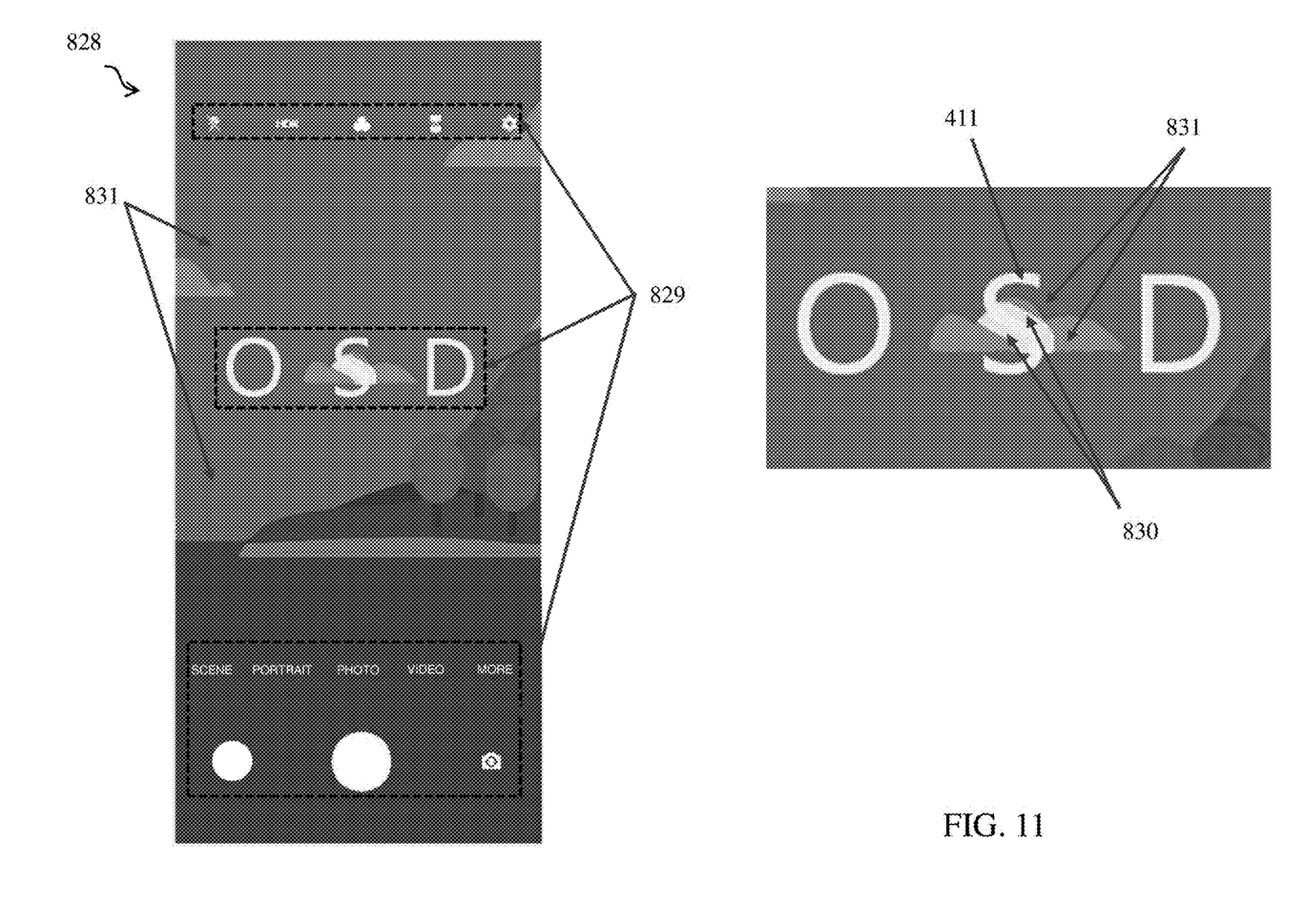
FIG. 11 is a schematic diagram of an output image, in accordance with some embodiments of the disclosure.

For example, with reference to FIGS. 9 to 11, a refined OSD pattern 829 included in the output image 828 of FIG. 11 is generated according to the blending image 823 of FIG. 9 and the refined OSD map 825 of FIG. 10. In some embodiments, the refined OSD pattern 829 is different from the OSD pattern 411. In various embodiments, a number of pixels included in the refined OSD pattern 829 is different from a number of pixels included in the OSD pattern 411.

Specifically, as illustratively shown in FIG. 11, the refined OSD pattern 829 includes the OSD pattern 411 and protection regions 830 in close proximity of part of the OSD pattern 411. The number of pixels included in the refined OSD pattern 829 is greater than the number of pixels included in the OSD pattern 411. In FIG. 11, the protection regions 830 are surrounded by the OSD pattern 411. The pixel values of pixels of the protection regions 830 are the same as the pixel values of pixels having the same pixel coordination in the blending image 823. In the embodiments of the corresponding regions in the input image 413 and regions in the blending image 823 that do not contain OSD information having identical pixel values, the pixel values of pixels of the protection regions 830 are the same as the pixel values of pixels having the same pixel coordination in the input image 413. Alternatively stated, some regions, corresponding to the protection regions 830, of the input image 413 are "protected" and the image data thereof are retained in the output image 828.

In some embodiments, the output image 828 includes remaining regions 831 being performed by image processing. As shown in FIGS. 9 and 11, the remaining regions in FIG. 9, apart from those that correspond to the refined OSD pattern 829, are darkened and appear as the remaining regions 831 in FIG. 11.

In some approaches, the transmission of user interface information includes OSD (on-screen display) information, which is integrated into 4×2 blocks. This integration method is not very accurate because it marks the remaining 7 points as long as there is UI in the upper left corner of the 4×2 block. Additionally, the sampling method used for integration is done only once every 4×2 blocks, so delicate UI information may be ignored. As a result, the remaining 7 points are determined based on the presence or absence of UI in the upper left corner of the OSD, leading to a high likelihood of redundant or missing information.

Compared with some approaches, the present disclosure involves optimizing the OSD map and blending it with the color map, for example, the input image. By utilizing the fact that the upper left corners of the blocks of the raw OSD map include accurate OSD information and comparing color image data, every pixel is verified by of the neighboring key pixels corresponding to OSD pattern, and thus pixel-wise OSD pattern with significant accuracy is provided.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An operation method performed by an image processor, comprising:

receiving, by the image processor, a mixed image including an input image and a first on-screen-display (OSD) pattern;

generating, by the image processor, a first OSD map and a blending image based on the mixed image;

generating, by the image processor, a second OSD map based on a plurality of first pixel values of the first OSD map and a plurality of second pixel values of the blending image, wherein generating the second OSD map comprises:

comparing, by the image processor, a maximum of a first portion of the plurality of first pixel values with a maximum of a second portion of the plurality of first pixel values to obtain a first difference, wherein the first portion of the plurality of first pixel values correspond to a plurality of key pixels in the first OSD map, and the second portion of the plurality of first pixel values correspond to a plurality of non-key pixels in the first OSD map;

comparing, by the image processor, the first difference with a first predetermined value;

comparing, by the image processor, a second predetermined value with a second difference between the maximum of the first portion of the plurality of first pixel values and one of the plurality of second pixel values corresponding to a pixel being verified in the blending image; and in response to the comparison, generating, by the image processor, a plurality of third pixel values of the second OSD map;

generating, by the image processor, a second OSD pattern, different from the first OSD pattern, based on the second OSD map and the blending image, wherein the second OSD pattern encompasses protection regions of the input image, wherein the protection regions are in close proximity of the first OSD pattern;

performing, by the image processor, image processing to remaining regions, different from the protection regions, of the input image; and generating, by the image processor, an output image, wherein the output image includes the second OSD pattern and the remaining regions of the input image, being performed by the image processing.

2. The operation method of claim 1, wherein the second OSD pattern in the output image includes the first OSD pattern, and the protection regions in the output image are surrounded by the first OSD pattern in the output image.

3. The operation method of claim 1, wherein a plurality of first pixels in the protection regions and a plurality of second pixels in the first OSD pattern are included in a plurality of blocks, wherein each of the plurality of second pixels is arranged in a corner of a corresponding one of the plurality of blocks.

4. The operation method of claim 1, wherein pixel values of the protection regions of the input image and pixel values of the protection regions of the output image are the same.

5. The operation method of claim 1, wherein a number of pixels included in the second OSD pattern is different from a number of pixels included in the first OSD pattern.

6. The operation method of claim 5, wherein the number of the pixels included in the second OSD pattern is greater than the number of the pixels included in the first OSD pattern.

7. The operation method of claim 1, wherein performing the image processing to the remaining regions comprises:

performing, by the image processor, color changing processing to the remaining regions.

8. The operation method of claim 1, wherein differences between pixel values in the protection regions and pixel values in the first OSD pattern are smaller than differences between pixel values in the remaining regions and pixel values in the first OSD pattern.

9. The operation method of claim 1, wherein generating the first OSD map and the blending image comprises:

generating, by the image processor, the first OSD map by adjusting alpha values in a plurality of fourth pixel values in the mixed image to have a first value, and generating, by the image processor, the blending image by adjusting the alpha values to have a second value different from the first value.

10. The operation method of claim 1, wherein the second predetermined value equals to a half of the first difference.

* * * * *